(12) United States Patent
Pearce

(10) Patent No.: US 8,695,431 B2
(45) Date of Patent: Apr. 15, 2014

(54) FLEXIBLE MICROSPHERE COATED PIEZOELECTRIC ACOUSTIC SENSOR APPARATUS AND METHOD OF USE THEREFOR

(75) Inventor: Richard E. Pearce, Weatherford, TX (US)

(73) Assignee: Solid Seismic, LLC, Mineral Wells, TX (US)

( * ) Notice: Subject to any disclaimer, the term of this patent is extended or adjusted under 35 U.S.C. 154(b) by 323 days.

(21) Appl. No.: 13/295,380

(22) Filed: Nov. 14, 2011

(65) Prior Publication Data
US 2012/0160030 A1  Jun. 28, 2012

Related U.S. Application Data

(60) Provisional application No. 61/427,775, filed on Dec. 28, 2010.

(51) Int. Cl.
*G01L 9/00* (2006.01)

(52) U.S. Cl.
USPC .................................. 73/753; 73/715; 73/721

(58) Field of Classification Search
None
See application file for complete search history.

(56) References Cited

U.S. PATENT DOCUMENTS

| | | | |
|---|---|---|---|
| 4,317,000 A | 2/1982 | Ferer | |
| 4,523,122 A * | 6/1985 | Tone et al. | 310/334 |
| 4,628,490 A * | 12/1986 | Kramer et al. | 367/1 |
| 4,733,378 A | 3/1988 | Pearce et al. | |
| 4,733,379 A | 3/1988 | Lapetina et al. | |
| 5,357,486 A | 10/1994 | Pearce | |
| 5,361,240 A | 11/1994 | Pearce | |
| 5,742,559 A | 4/1998 | Marschall et al. | |
| 5,774,423 A | 6/1998 | Pearce et al. | |
| 5,883,857 A | 3/1999 | Pearce | |
| 5,982,708 A | 11/1999 | Pearce | |
| 6,108,267 A | 8/2000 | Pearce | |
| 6,108,274 A | 8/2000 | Pearce | |
| 6,498,769 B1 | 12/2002 | Pearce | |
| 6,614,723 B2 | 9/2003 | Pearce et al. | |
| 6,819,631 B2 | 11/2004 | Pearce | |
| 8,819,631 | 11/2004 | Pearce | |
| 6,982,383 B1 | 1/2006 | Spellman et al. | |
| 2004/0017731 A1 | 1/2004 | Halvorsen et al. | |
| 2007/0025917 A1* | 2/2007 | Tian et al. | 424/9.6 |
| 2009/0065289 A1 | 3/2009 | Tenghamn et al. | |
| 2010/0165787 A1 | 7/2010 | Fernihough et al. | |

* cited by examiner

*Primary Examiner* — Lisa Caputo
*Assistant Examiner* — Jermaine Jenkins
(74) *Attorney, Agent, or Firm* — Bell Nunnally & Martin LLP; Craig J. Cox

(57) ABSTRACT

Sensors used in mapping strata beneath a marine body are described, such as in a towed array. A first acoustic sensor uses a piezoelectric sensor mounted with a thin film separation layer of flexible microspheres on a rigid substrate. Additional non-acoustic sensors are optionally mounted on the rigid substrate for generation of output used to reduce noise observed by the acoustic sensors. A second sensor is a motion sensor including a conductive liquid in a chamber between a rigid tube and a piezoelectric motion film circumferentially wrapped about the tube. Combinations of acoustic, non-acoustic, and motion sensors co-located in rigid streamer housing sections are provided, which reduce noise associated with different sensor locations.

22 Claims, 4 Drawing Sheets

FLEXIBLE MICROSPHERE COATED PIEZOELECTRIC ACOUSTIC SENSOR APPARATUS AND METHOD OF USE THEREFOR

CROSS-REFERENCES TO RELATED APPLICATIONS

This application claims the benefit of U.S. provisional patent application No. 61/427,775 filed Dec. 28, 2010, all of which is incorporated herein in its entirety by this reference thereto.

TECHNICAL FIELD OF THE INVENTION

The present invention relates to use of sensors to map strata beneath a body of water and/or to sense an object in water.

DESCRIPTION OF THE RELATED ART

Towed arrays of hydrophone sensors are used to map strata beneath large bodies of water, such as gulfs, straights, and oceans.

Patents related to the current invention are summarized herein.

Streamer Cable

R. Pearce, "Non-Liquid Filled Streamer Cable with a Novel Hydrophone", U.S. Pat. No. 5,883,857 (Mar. 16, 1999) describes a streamer cable including a plurality of serially coupled active cable sections having hydrophones located within an outer jacket and a longitudinally and centrally located electro-mechanical cable.

R. Pearce, "Non-Liquid Filled Streamer Cable with a Novel Hydrophone", U.S. Pat. No. 6,108,267 (Aug. 22, 2000) describes a towed array having a central strain member, an inner protective jacket about the strain member, a foam material about the inner protective jacket, and a potting material bonded to the inner protective jacket inside an outer protective jacket.

R. Pearce, "Method and Apparatus for a Non-Oil-Filled Towed Array with a Novel Hydrophone and Uniform Buoyancy Technique", U.S. Pat. No. 6,498,769 B1 (Dec. 24, 2002) describes a towed array having uniform buoyancy achieved using hollow microspheres in a polyurethane matrix, where the percentage of hollow microspheres is correlated with adjacent density of elements of the towed array.

R. Pearce, "Acoustic Sensor Array", U.S. Pat. No. 6,614,723 B2 (Sep. 2, 2003) describes an acoustic sensor array having buoyant sections formed using reaction injection molding with controlled and varying amounts of hollow microspheres and polyurethane as a function of position on the array.

Sensor

R. Pearce, "Acoustic Transducer", U.S. Pat. No. 5,357,486 (Oct. 18, 1994) describes a piezoelectric film strip wrapped around a mandrel having stand off collars on each end. Variations in hydrodynamic pressure flex the film strip in tension to generate a voltage.

R. Pearce, "Acoustic Sensor", U.S. Pat. No. 5,361,240 (No. 1, 1994) describes an acoustic sensor having a hollow mandrel with an outer surface defining a concavity and a flexible piezoelectric film wrapped about the outer surface forming a volume between the film and the mandrel, the volume serving as a pressure compensating chamber.

R. Pearce, "Acoustic Sensor and Array Thereof", U.S. Pat. No. 5,774,423 (Jun. 30, 1998) describes an acoustic sensor having electrically coupled piezoelectric materials.

R. Pearce, "Acoustic Sensor and Array Thereof", U.S. Pat. No. 5,982,708 (Nov. 9, 1999) describes an acoustic sensor having a substrate with a concavity on an outer surface that is sealingly enclosed by an active member of a piezoelectric material.

R. Pearce, "Acoustic Sensor and Array Thereof", U.S. Pat. No. 6,108,274 (Aug. 22, 2000) describes an acoustic sensor having a mandrel, a first substrate on an outer surface of the mandrel, a damping layer between the first substrate and a second substrate, a piezoelectric sensor mounted to the second substrate, and an encapsulating material on the piezoelectric material.

R. Pearce, "Method and Apparatus for a Non-Oil-Filled Towed Array with a Novel Hydrophone and Uniform Buoyancy Technique", U.S. Pat. No. 6,819,631 B2 (Nov. 16, 2004) describes a towable hydrophone having a diaphragm with a tubular shape, a thin film piezoelectric element attached to the diaphragm, the diaphragm having a back plane having a cylindrical shape, and at least one longitudinal rib on the exterior of the back plane, where the back plane and exterior rib slidingly engage the tubular diaphragm.

Problem Statement

What is needed is one or more sensors for use in mapping strata under a water body having increased insensitivity to noise sources and enhanced band width.

SUMMARY OF THE INVENTION

The invention comprises a piezoelectric sensor method and apparatus.

BRIEF DESCRIPTION OF THE DRAWINGS

A more complete understanding of the present invention is derived by referring to the detailed description and claims when considered in connection with the Figures, wherein like reference numbers refer to similar items throughout the Figures.

Figure 1:
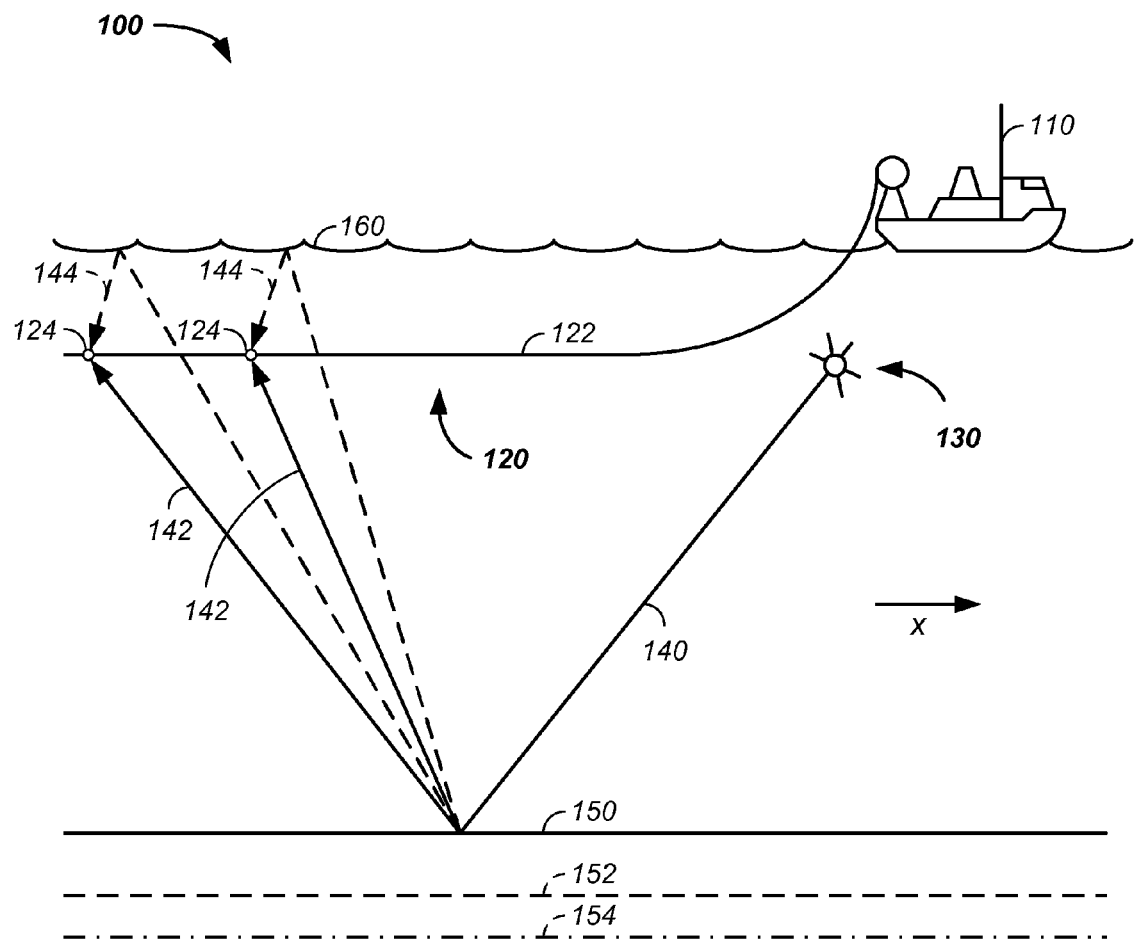
FIG. 1 illustrates a towed sensor array and potential water body surface interference.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE PREFERRED EMBODIMENTS

The invention comprises a noise cancelling piezoelectric sensor apparatus and method of use thereof.

In one embodiment, a liquid metal electrode coupled with a piezoelectric element is used to sense upward vertical motion while minimizing downward vertical motion.

In another embodiment, an acoustic sensor is provided having a piezoelectric sensor coupled with a microsphere loaded transfer adhesive as a compressible gas chamber.

In still yet another embodiment, an acoustic sensor is vertically coupled with a motion sensor to form a dual output seismic survey sensor. For example, a method and apparatus is described for a monolithic dual output, piezoelectric polymer thin film flexible microsphere backed flow noise cancelling acoustic sensor. The sensor optionally uses a conductive liquid piezoelectric polymer thin film motion sensor embodied in a flexible syntactic elastomer based solid seismic streamer for enhanced data acquisition in marine seismic surveys and passive acquisition.

In one example, the system includes two piezopolymer thin film elements configured in such a manner as to form a dedicated motion sensor and a dedicated flow noise cancelling acoustic sensor, both of which are excited by forces and/or identical forces manifested as dynamic pressure with immunity to acceleration and dynamic particle motion with immunity to dynamic pressure so as to allow for the discreet measurement of acoustic energy and particle motion present at a single location. The acoustic sensor being embodied in such a manner as to allow the inherent response characteristics of thin film polyvinylidene fluoride (PVDF) to sense both acoustics and noise produced by the turbulent boundary layer as dynamic pressure while simultaneously sensing only the turbulent boundary layer manifested as a response to a force, producing a response in the non-acoustic portion of the element to the turbulent boundary layer that is about one hundred eighty degrees out of phase with that detected on the acoustic portion of the element. This is optionally accomplished in a single contiguous sensor mechanically constrained in such a way as to allow a portion of the element to respond to dynamic pressure and a portion of the element to respond only to mechanical force. A simple embodiment of this invention is presented with the sensor comprised of a single piece of PVDF film where a single strip of acoustic sensor is surrounded by two strips of force sensor. Complex patterns are also available to enhance the performance of the invention utilizing fractal pattern sampling of the turbulent boundary layer. The completed sensors are then used to construct a seismic streamer section necessarily of a solid construction where the sensors are placed.

Axes

Referring now to FIG. 1, herein an x-axis is in a horizontal direction of towing of a sensor array. The x/y axes form a plane parallel to a water body surface. The z-axis is aligned with gravity. Typically, the thickness of a piezoelectric film is viewed in terms of a z-axis, though the piezoelectric film is optionally rolled about a mandrel, described infra.

Piezoelectric Material

Piezoelectricity is charge that accumulates in certain solid materials in response to applied mechanical stress. A piezoelectric material generates electricity from applied pressure.

An example of a piezoelectric material is polyvinylidene fluoride (PVDF). Unlike ceramics, where the crystal structure of the material creates the piezoelectric effect, in the PVDF polymer intertwined long-chain molecules attract and repel each other when an electric field is applied.

The polyvinylidene material is particularly useful in aqueous environments as the acoustic impedance of PVDF is similar to that of water. An external mechanical force applied to a film of polyvinylidene fluoride results in a compressive or tensile force strain. A film of PVDF develops an open circuit voltage, or electrical charge, which is proportional to the changes in the mechanical stress or strain. By convention, the polarization axis is the thickness axis of the polyvinylidene material. Tensile stress may take place along either the longitudinal axis or the width axis.

Herein, for clarity, polyvinylidene fluoride is used as an example of the piezoelectric material. However, any material that generates a charge in response to pressure is optionally used. Examples include: man-made crystals, such as gallium orthophosphate, a quartz analogic crystal, and langasite; man-made ceramics, such as a titanate, a niobate, a tantalate, or a tungstate; and/or a lead-free piezoceramic.

A PVDF material is characterized in terms of a strip of PVDF film. The PVDF film includes a width axis or x-x axis, a length axis or y-y axis, and a thickness axis or z-z axis. The PVDF film x-x axis is less sensitive, in terms of developed charge, to applied forces than the length axis or the thickness axis of the PVDF film. Hence, in the sensors described herein, the width axis of the PVDF film is typically about parallel to the towing direction of the sensor array to minimize noise signals resultant from towing of the sensor array with a cable under varying strain. As described, infra, expansion of the y-y axis of the PVDF film is optionally restrained in a mounting step, which results in increased thickness changes of the PVDF film resultant from applied forces. The increased thickness change as a function of applied force is equivalent to an increased signal-to-noise ratio.

The PVDF film is optionally cut, shaped, or wrapped about a surface, such as a mandrel or hollow tube.

A PVDF sensor is a PVDF film coupled with at least one charge transfer element, such as a conductive wire. In one case, a PVDF sensor includes a PVDF film coated on both sides with a conductive ink. In a second case, the PVDF film is coated on one side with a conductive ink and the opposite side makes contact with a conductive fluid, as described infra, to form a PVDF sensor.

Conditioning Electronics

Electric output from the PVDF sensor is carried along a conductive element, such as a wire, to an electrical circuit. The electrical circuit optionally includes: a current to voltage converter, such as a preamplifier, an amplifier, processing electronics, an analog-to-digital converter, and/or a data buss. Signal from a first PVDF sensor is optionally:
  combined with signal from a second PVDF sensor using the on-board electrical circuit; and/or
  is post processed after communication of the gathered signal to a processing center.

Towed Sensor Array

Still referring to FIG. 1, a system for mapping strata 100 under a floor of a water body is illustrated. In the illustrated example, a ship 110 tows one or more sensor arrays 120. A sensor array 120 includes at least a streamer cable 122 and a sensor 124.

The streamer cable 122 includes:
  a strain member, such as a central strain member;
  a wire bundle configured to carry power and/or data, the wire bundle is preferably wrapped about the strain member to reduce strain from towing;
  a plurality of sensors 124, such as about equispaced or not equally spaced hydrophones, non-acoustic sensors, and/or accelerometers;
  electronics;
  a buoyancy element; and/or
  a protective jacket about the sensors, strain member, and wire bundle.

The sensors are further described, infra.

In use, a seismic shock wave is generated, such as with an explosive 130. For clarity of presentation, a single shock wave 140 from the explosive 130 is illustrated. The shock wave 140 partially reflects from a floor 150 of the water body, and/or from a series of strata layers 152, 154 under the water body floor 150. Again for clarity, only a subset of the surface and strata reflections are illustrated. In one case, the surface reflections yield a vertically rising seismic wave 142 that strikes the one or more sensors 124. In a second case, a seismic wave at least partially reflects off of a water body surface 160 to yield a vertically descending seismic wave 144, which strikes the one or more sensors 124. The vertically descending seismic wave is an interference signal, which reduces the bandwidth and associated signal-to-noise ratio of the sensors 124.

Still referring to FIG. 1, those skilled in the art know that a matrix of sensors may be used to map strata layers, where the matrix of sensors each detect a plurality of seismic waves, each of the seismic waves reflected off of a plurality of strata layers at a plurality of spatial positions as a function of time.
Sensors The sensors 124 are further described. Any of the sensors 124 described herein are optionally coated with a flexible solid material as part of the streamer 122. Further, sensors 124 are optionally positioned at any x-axis position of the streamer 122 to form the sensor array 120, though equispacing of like sensor elements 124 is preferred.
Motion Sensor Referring now to FIG. 2A and FIG. 2B, an example of a motion sensor 200 or accelerometer is described. For clarity, elements of the motion sensor 200 are illustrated in a rolled out plane in FIG. 2A, while the same elements of the motion sensor are illustrated wrapped about a substrate 210 in FIG. 2B.

Figure 2A:
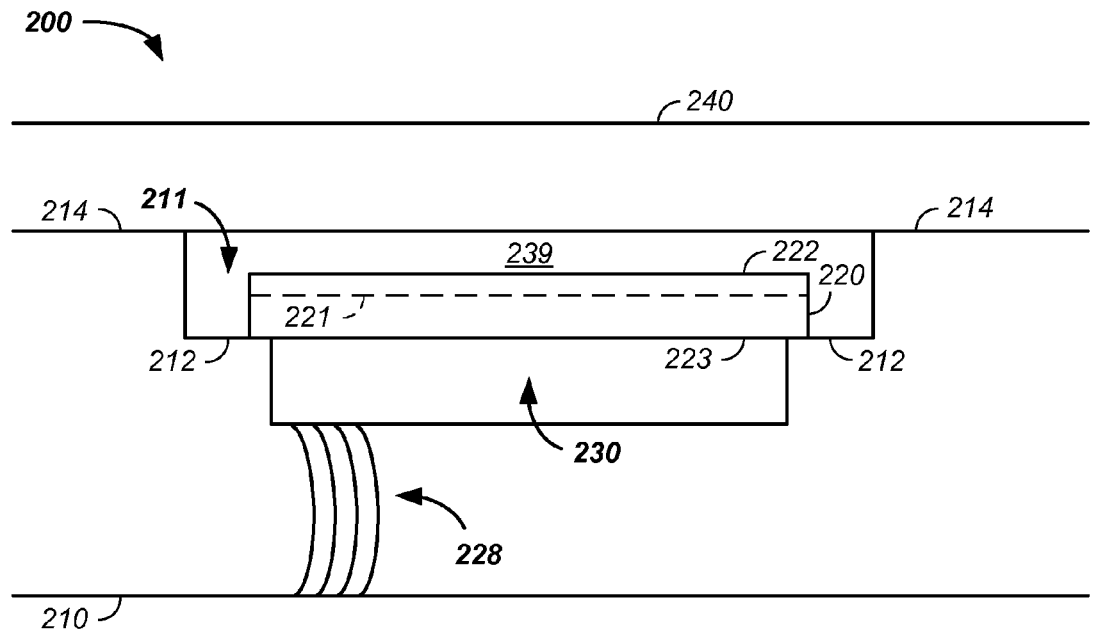
FIG. 2 figuratively illustrates motion sensor elements, FIG. 2A, and a vertical cross-section of a towable accelerometer sensor, FIG. 2B.
Figure 2B:
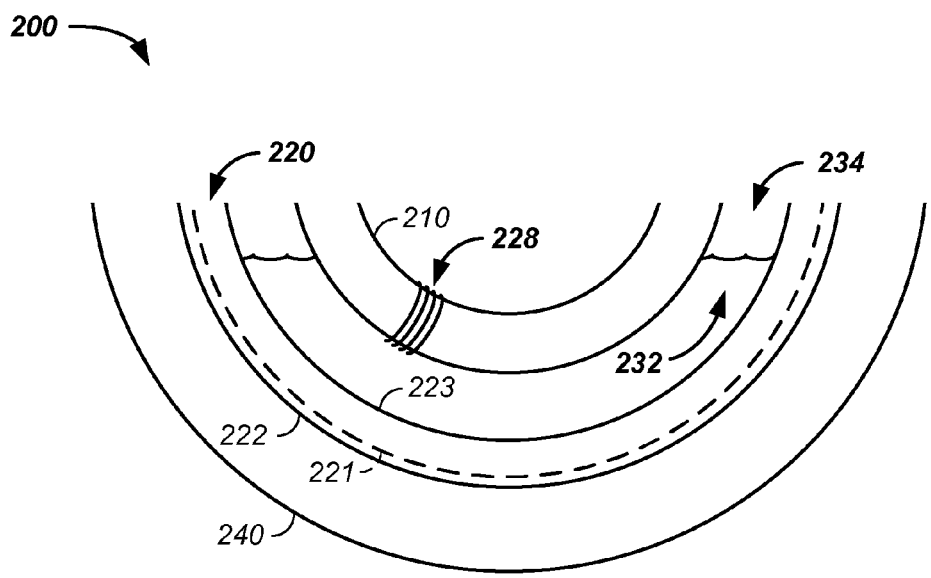

Still referring to FIG. 2A, the motion sensor 200 includes:
- a substrate 210;
- a piezoelectric motion film 220 optionally attached to a diaphragm; and
- a hollow cavity, hollow chamber, and/or an enclosed chamber 230 between the substrate 210 and the piezoelectric motion film 220.

Each of the motion sensor 200 elements are further described herein.

In practice, the substrate 210 is optionally a hollow tube or a hollow mandrel. The substrate 210 is sufficiently rigid to isolate internally radiated stresses from the embodied piezo elements in both the motion sensor 200 and the acoustic sensor 300 described, infra. The substrate 210 optionally includes a concave inner surface, defining an inner wall of a tube. The tube is optionally used to contain and/or to constrain movement of centrally placed elements, such as a strain member of the streamer cable 122, the wire bundle configured to carry power and/or data, a shock absorbing element, and/or the electronics. The substrate 210 also optionally includes a convex outer surface upon which the sensor elements are mounted. The convex outer surface of the substrate 210 optionally contains an outer concavity or channel 211. The channel or cavity 211 is created either through machining or through a molding process by which the channel 211 is presented around a circumference located outside the rigid mandrel or substrate 210. Sensor elements are optionally located in the outer concavity or channel 211. For example, in one case the substrate 210 includes a pair of inner shoulders 212, which function as a mechanical support for a diaphragm and/or the piezoelectric motion film 220. The inner shoulders 212 are either machined or molded and are located outside and to the side of the created channel 211 at a depth and width sufficient to allow attachment of the piezofilm motion sensor element 220 forming a sealed chamber 230. Optionally, the motion sensor 200 includes an outer motion sensor housing 240. The outer motion sensor housing 240 or second rigid cylindrical mandrel is positioned over a cavity formed by the outer shoulders 214 thus sealing the entire conductive fluid filled accelerometer sensor or motion sensor 200 inside. The outer motion sensor housing 240 prevents or reduces the motion sensor 200 from responding to dynamic pressure.

Further, the outer motion sensor housing 240 optionally forms an outer mandrel upon which an outer passive flow noise cancelling acoustic sensor 300 is positioned. Preferably, the outer motion sensor housing 240 is rigid or semi-rigid. The outer motion sensor housing 240 is optionally connected to the substrate 210, such as through a pair of outer shoulders 214 positioned along the x-axis further from a center of the enclosed chamber 230 relative to the inner shoulders 212. The additional set of outer shoulders 214 adjacent and outside the inner shoulders 212 optionally form a second chamber above the first thin film piezoelectric element. Both the inner and outer shoulders 212, 214 are optionally a part the substrate 210, are removable elements affixed to the substrate 210, are affixed to the motion sensor housing 240, and/or are part of the motion sensor housing 240.

The piezoelectric motion film 220 is mounted radially outward from the substrate 210 in a manner forming a sealed hollow chamber 230 therebetween. For example, the piezoelectric polymer thin motion film element 220 is constructed with a deposited single electrode on the outer surface 221 so as to create a continuous electrode around the circumference of the resulting piezofilm cylinder created when the film is attached to the shoulders 212 previously described and sealed where the film wrap overlaps creating the hollow and sealed chamber 230 between the piezoelectric motion film 220 and the substrate 210 within the channel 211. For example, the piezoelectric motion film 220 is mounted over a portion of the outer concavity or channel of the substrate 210 or is mounted directly or indirectly to the inner shoulders 212. The piezoelectric motion film 220 optionally forms one or more layers circumferentially surrounding the substrate 210. The hollow chamber 230 extends to at least partially circumferentially encompass an x-axis section of the substrate 210. In one case, the piezoelectric film mounts directly to the substrate 210, such as by mounting to the inner shoulders 212 of the substrate 210. Mechanically affixing, such as with a wrap and/or an adhesive, the piezoelectric motion film 220 to the inner shoulders 212 restricts movement of the y-y axis of the piezoelectric film. The restricted y-y axis motion of the piezoelectric motion film 220 and the orientation of the x-x axis of the piezoelectric film along the x-axis or towing axis results in enhanced changes in the z-z thickness axis of the piezoelectric film as a response to pressure/size changes resultant from the seismic waves 140, which increases the signal-to-noise ratio of the motion sensor 200. In additional cases, the piezoelectric motion film 220 is indirectly affixed to the substrate 210, such as through the use of a diaphragm. In all cases, at least a portion of the hollow chamber 230 is physically positioned between the substrate 210 and the piezoelectric motion film 220.

Changes in thickness of the piezoelectric motion film 220, which is proportional to the changes in the mechanical stress or strain resulting from the seismic wave 140, is measured using electrical connections to the piezoelectric motion film 220. A first electrical connection is made to an outer surface 221 or radially outward surface of the piezoelectric motion film 220 using conductive material, such as a flexible conductive ink 222, applied to the outer surface 221 of the piezoelectric film. For example, a wire is attached by suitable means to the plated outer electrode or conductive ink 222 of the piezoelectric motion film 220 and passed through the outer shoulders 214, where the wire is connected to signal wires of the motion sensor 200. A second electrical connection to at least a portion of a radially inner surface 223 of the piezoelectric motion film 220 is made using a conductive fluid 232, contained in the hollow chamber 230, where the conductive fluid contacts the radially inner surface 223 of the piezoelectric motion film 220. At least one electrical lead 228 runs through a portion of the conductive fluid 232 in the hollow chamber 230. The open circuit voltage, or electrical charge, of the piezoelectric acoustic film 220, which is proportional to the changes in the mechanical stress or strain, is measured using the electrical signal carried by the conductive ink 222 and the electrical lead 228. For example, the electrical lead is an electrically conductive wire or sheet adhered to the outer diameter of the hollow chamber 230 so as to form a conductive surface or electrode using a stable metallic material. In a case where wire is used, the wire is optionally wrapped a plurality of turns around the circumference of the substrate 210 so as to create a continuous conductive path around the circumference passing the wire from the inside of the conductive fluid 232 filled hollow chamber 230 to the outside of the hollow chamber 230 through a hole in the inner shoulder 211, which is later sealed to prevent leakage of the conductive fluid. As the external hydrostatic pressure increases or decreases, resultant from the seismic wave 140, contraction or expansion of the substrate 210 and/or diaphragm to which the substrate is optionally mounted results in corresponding contraction or expansion of the hollow chamber 230, the conductive fluid 232 in hollow chamber 230, the diaphragm, and/or the piezoelectric motion film 220. Changes in the piezoelectric motion film 220, such as in the z-z thickness axis, are measured using the first electrical connection made to the conductive ink 222 on one side of the piezoelectric motion film 220 and the second electrical connection using the electrical lead 228 passing through the conductive fluid 232 on the opposite side of the piezoelectric film.

The conductive fluid 232 has a density greater than air, which causes the conductive fluid 232 to settle to the bottom of the hollow chamber 230. In practice, the hollow chamber has a capacity volume and the filling volume of the conductive fluid 232 is less than the capacity volume, such as less than about 75, 50, 40, 30, or 20 percent of the capacity volume. As the conductive fluid 232 is used to transmit the seismic wave 140 and the conductive fluid only fills a lower portion of the hollow chamber 230, the vertically ascending seismic waves 142 are sensed by the motion sensor 200 and the vertically descending seismic waves 144 are dampened and/or are not detected by the motion sensor 200. As the motion sensor 200 is insensitive or less sensitive to the vertically descending seismic waves 144, the reflected signal from the water body surface 160 is not detected and the useable bandwidth or signal-to-noise ratio of the motion sensor is enhanced relative to a motion sensor not having a hollow chamber partially filled with a conductive fluid.

Generally, a sufficient amount of a preferably non-toxic conductive fluid 232 is introduced into the hollow chamber 230 or sealed cavity to form a liquid electrode positioned by gravity at the lowest point in the circumference of the hollow chamber 230 or inner chamber. The fluid 232 resides in contact with the inside diameter of the wrapped piezoelectric motion polymer film 220, spreading over an about fixed surface area defined by the amount of the conductive fluid 232 placed in the hollow chamber 230. The amount of the conductive fluid 232 determines the reactive mass as well as the electrical characteristics of the piezoelectric sensor in terms of capacitance. The material comes in contact with the piezoelectric motion film 220 and simultaneously in contact with the conductive wire 228 wrapped around the circumference of the inner diameter of the cavity or channel 211 thus transferring signal from the piezoelectric motion film 220 inner surface 223, through the conductive fluid 232 or liquid metal, through the conductive wire wrap 228 and out of the hollow chamber 230 to the outside of the channel 211 or cavity where it is connected to signal wires of the motion sensor 200.

Examples of a conductive fluid 232 include at least one of:
a fluid capable of electrical conductance;
a non-aqueous fluid;
a fluid containing a metal;
a fluid having a freezing point less than zero degrees centigrade;
a fluid having a freezing point of negative two degrees centigrade or less;
a fluid having an electrical conductivity of at least 2,000, 5,000, and/or 10,000 siemens per meter (S/m) at 20° C.;
a eutectic alloy;
a fluid including at least five percent tin;
a fluid containing at least five percent gallium;
a fluid containing at least five percent indium; and
a galinstan® (Geratherm Medical AG, Germany) fluid.

In practice, the conductive fluid 232 moves in the hollow chamber 230 due to motion of the streamer cable 122. As the conductive fluid sloshes or flows along the y/z axis in the hollow chamber 230 about the substrate 210, the contact area of the conductive fluid 232 with the inner surface 223 of the piezoelectric motion film 220 is about constant. Hence, the motion sensor 200 is generally unaffected by motion of the conductive fluid 232. However, optionally a motion damping fluid 234 is added to the hollow chamber 230. The damping fluid 234 in the hollow chamber 230 or cavity prevents wetting of the surfaces by the conductive fluid and/or provides damping of the movement of the fluid under cross-axis excitation, thus limiting response to undesirable off axis motion preserving the uniaxial response of the motion sensor. The motion damping fluid 234 is substantially non-conductive, is about non-miscible with the conductive fluid 232, and/or has a density less than that of the conductive fluid 232. Optionally, the volume of the motion damping fluid 234 and the volume of conductive fluid 232 combine to about equal the capacity volume of the hollow chamber 230. The physical resistance of the motion damping fluid 234 reduces movement of the conductive fluid along the y/z axis in the hollow chamber 230 about the substrate 210.

In any of the sensors 124 described herein, any of the layers, such as an outer buoyancy element are optionally configured with glass spheres, which function as a buoyancy element. Generally, the glass spheres are incompressible up to about two thousand pounds per square inch. Glass spheres are useful in maintenance of uniform buoyancy regardless of the depth at which the streamer 120 is towed. A preferred glass sphere has a density of about 0.32 g/cm$^3$; however the glass spheres optionally have a density of less than water and/or less than about 0.9, 0.8, 0.7, 0.6, 0.5, 0.4, 0.3, or 0.2 g/cm$^3$.

Acoustic Sensor

Figure 3A:
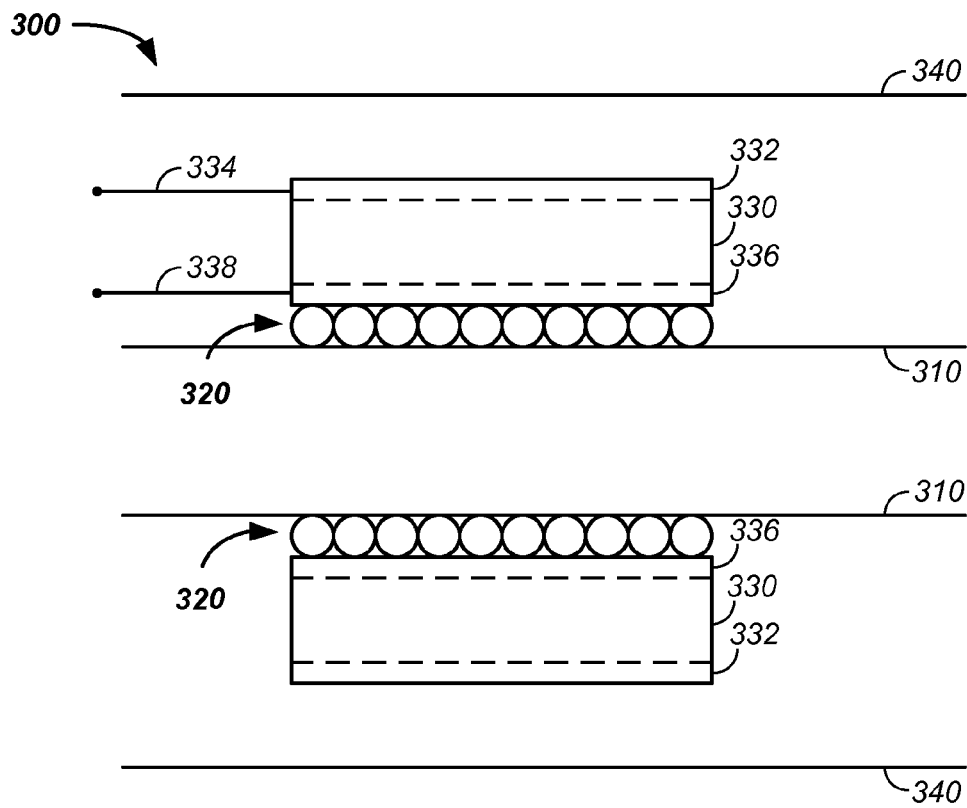
FIG. 3 provides an acoustic sensor using microspheres, FIG. 3A, and the acoustic sensor in cross section, FIG. 3B.
Figure 3B:
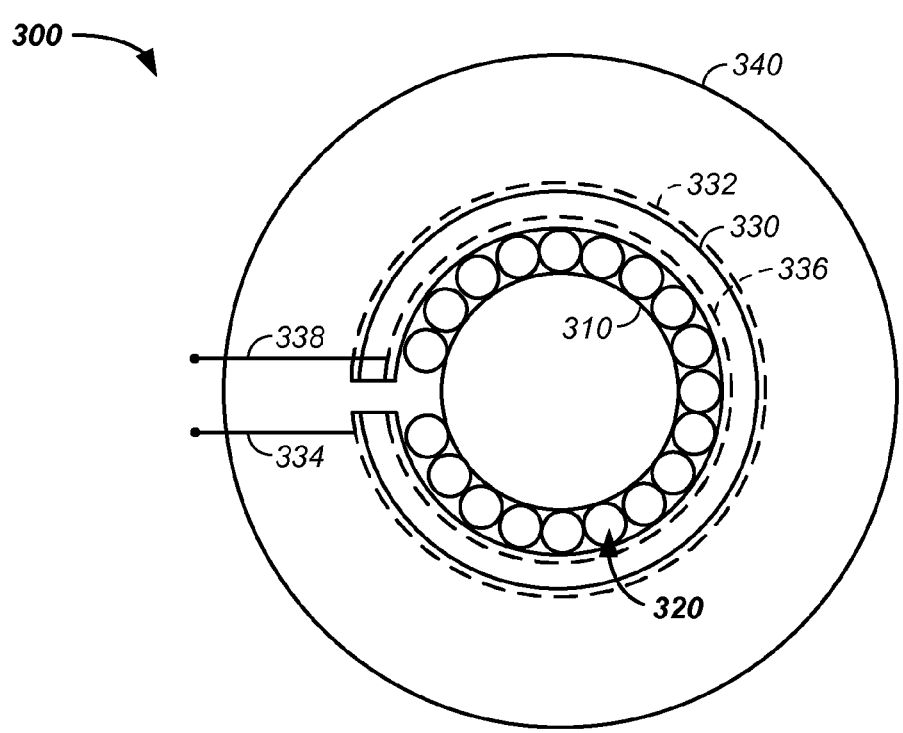

Referring now to FIG. 3A and FIG. 3B, an acoustic sensor 300 is illustrated. The acoustic sensor uses a piezoelectric film, which is described herein as a piezoelectric acoustic film 330 to distinguish from the above described piezoelectric motion film 220, though both maintain the general properties of a piezoelectric material or element.

Still referring to FIG. 3A and FIG. 3B, in this example the acoustic sensor 300 uses a mandrel 310. However, the mandrel 310 is optionally any rigid surface, such as a hollow cylinder or tube about the motion sensor 200 described supra. For example, the outer motion sensor housing 240 of the motion sensor 200 is optionally used in place of the mandrel 310. A piezoelectric acoustic film 330 is wrapped about the mandrel 310. The piezoelectric acoustic film 330 includes a conductive material on both the outer surface 332 and the inner surface 336. For example, a first electrical connector 334 is connected to a first flexible conductive ink circuit on the outer surface 332 of the piezoelectric acoustic film 330. Similarly, a second electrical connector 338 is connected to a second flexible conductive ink circuit on the inner surface 336 of the piezoelectric acoustic film 330. A set of flexible microspheres 320 are positioned between the mandrel 310 and the inner layer 336 of the piezoelectric acoustic film 330. The outer surface 332 of the piezoelectric acoustic film 330 is optionally coated or contained within a flexible solid 340.

The microspheres 320 are responsive to pressure and mechanically isolate the piezoelectric acoustic film 330. For example, if the acoustic sensor 300 is mounted on a structure that is struck, the microspheres 320 isolate the piezoelectric acoustic film 330 of the acoustic sensor 300 from the transmitted energy in the structure.

The set of microspheres 320 is optionally a single layer of microspheres or a thickness of microspheres 320, such as less than about 10, 20, 30, 40, 50, 60, 70, 80, 90, 100, 150, 200, 300, 500, 1000, 5000, or 10,000 micrometers thickness. The average diameter of the microspheres 320 is less than about 1, 2, 5, 10, 20, 50, 100, or 1000 micrometers.

The microspheres 320 are generally flexible, are preferably plastic, and are not to be confused with incompressible glass spheres used for buoyancy control, such as in the outer member.

The microspheres 320 in the hydrophone sensor 300 are optionally flexible and/or plastic. In the piezoelectric acoustic sensor 300 or hydrophone, the compressible microspheres 320 are optionally placed into and/or onto an adhesive material, such as to form an adhesive strip or a sphere coated and/or impregnated transfer adhesive. For example, the transfer adhesive is optionally a flexible layer, polymer, or tape coated on preferably one side and optionally both sides with a layer of the flexible microspheres 320. The flexible microspheres on and/or in the transfer adhesive are wrapped about the rigid surface or mandrel, or rigid motion sensor housing 240. Preferably, the microspheres 320 are coated onto a surface of the transfer adhesive and the sphere coated surface of the transfer adhesive is wrapped about the rigid motion sensor housing 240 to form a layer of flexible microspheres 320 on the inner surface of the piezoelectric polymer acoustic film 330 circumferentially wrapped on the rigid substrate 240 or mandrel 310.

In practice, an acoustic pressure wave 140 is converted to a mechanical motion at the water/flexible solid 340 interface. The mechanical motion is transferred to the piezoelectric acoustic film 330, where a change in shape of the piezoelectric acoustic film 330 is picked up as a corresponding electrical signal using the first electrical connector connected to the first flexible conductive ink circuit on the outer surface 332 of the piezoelectric acoustic film 330 and the second flexible conductive ink circuit on the inner surface 336 of the piezoelectric acoustic film 330. The electrical signal is amplified and processed, as described supra, to yield information on the floor 150 of the water body and on the series of strata layers 152, 154 under the water body floor 150.

Multiple Sensors

Multiple sensors are optionally used in each sensor section of the sensor array 120. For example, output from one or more motion sensor 200 is combined with output from one or more acoustic sensor 300, and/or output from a first motion sensor is combined with output from a second motion sensor, output from a first acoustic sensor is combined with output from a second acoustic sensor. The process of combining the signals optionally occurs in a pre-processing stage by use of electronic circuitry and/or occurs in a post-processing digital signal processing process.

Optionally, the central elements, such as any of the sensor elements described herein, are encased in an outer element, such as a buoyancy element. The buoyancy element:
is optionally used with any sensor 124 herein;
optionally contains non-compressible glass spheres; and
contains varying amounts of the glass spheres to adjust buoyancy as a function of x-axis position and/or as a function of streamer element size and density.

Stacked Sensors

Optionally, two or more sensors are stacked along the y- and z-axes at a given point or length along the x-axis of the streamer cable 122.

Figure 4:
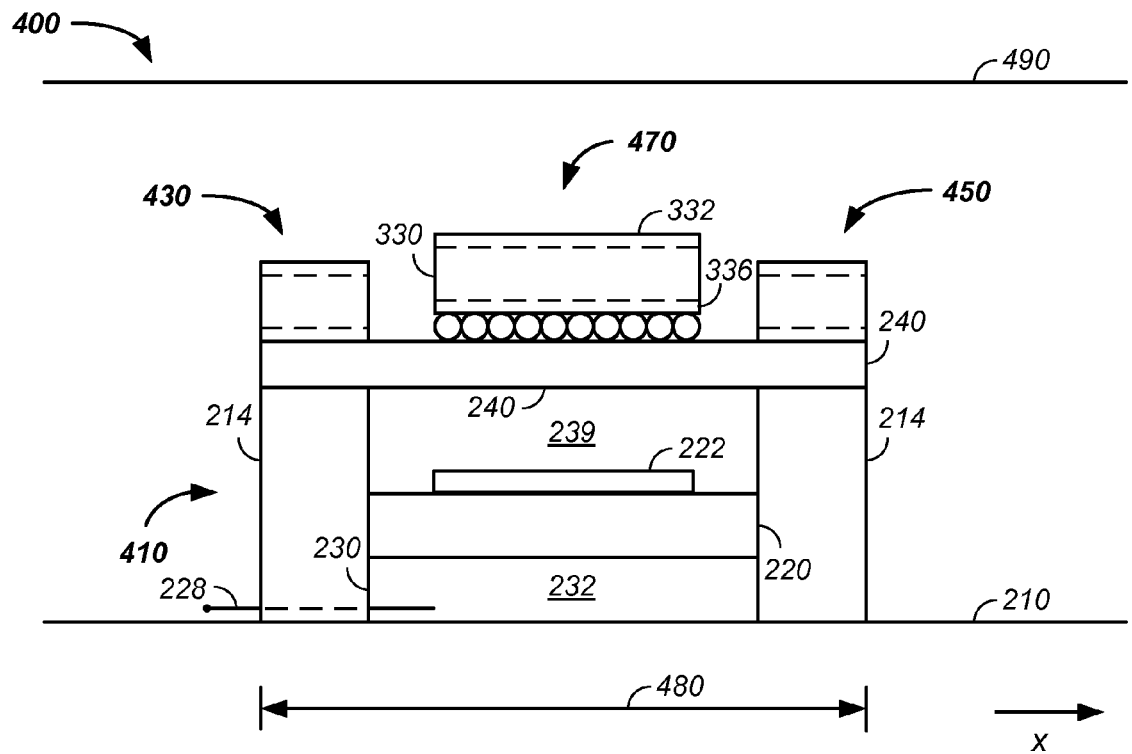
FIG. 4 illustrates stacked sensors.

Referring now to FIG. 4, an example of a motion sensor and an acoustic sensor in a stacked geometry 400 is illustrated. For clarity, a radial cross-section of only one side of the sensor is illustrated. Generally, the stacked motion sensor 410 includes any of the elements of the motion sensor 200. Similarly, the stacked acoustic sensor 470 includes any of the elements of the acoustic sensor 300.

Still referring to FIG. 4, for clarity of presentation character reference labels for like elements of the motion sensor 200 and the acoustic sensor 300 are used in the stacked sensor 400. However, varying mounting structures, connections, and orientations of elements are used to further illustrate permutations and combinations of sensor 124 elements.

Still referring to FIG. 4, an example of a combined sensor is provided. While individual sensor sections are optionally placed in different positions relative to each other, the illustrated example uses:
a sensor accelerometer 410 positioned on a substrate 210;
an optional first non-acoustic sensor 430 positioned radially outward from a center of the substrate 210 relative to the sensor accelerometer 410;
an optional second non-acoustic sensor 450 positioned radially outward from a center of the substrate 210 relative to the sensor accelerometer 410; and
an acoustic sensor 470 positioned both radially outward from the center of the substrate 210 relative to the sensor accelerometer 410 and about adjacent to at least one of the first and second non-acoustic sensors 430, 450.

Generally, the sensor accelerometer 410 uses piezoelectric motion film 220 between a metalized ink 222 conductor on a first z-axis side, a conductive fluid 232 in an enclosed chamber 230 on a second z-axis side of the piezoelectric motion film 220, and an electrical lead 228 passing through a portion of the conductive fluid 232 in the hollow chamber 230. Any of the motion sensor 200 elements described supra, such as the inner shoulders 212, diaphragm, and/or the edge constraints are optionally used. Optionally, the accelerometer 410 in the combined sensor 400 does not use the conductive fluid 432 and instead uses a traditional motion sensor design.

Generally, the non-acoustic sensors 430, 450 are offset from the substrate 210 using a rigid support, such as the outer shoulders 214. The non-acoustic sensors are attached without a substantial gap in rigid layers to the convex side of the substrate 210, such as through the outer shoulder 214 and or through the rigid motion sensor housing 240 circumferentially encompassing the sensor accelerometer 410. The one or more optional non-acoustic sensors 430, 450 are preferably located within about 1, 2, 3, 4, 5, 10, 15, or 20 centimeters of the sensor accelerometer 410 and/or the acoustic sensor 470. Each of the one or more non-acoustic sensors 430, 450 include a piezoelectric film between two conductive layers, such as metalized ink layers.

Generally, the offset acoustic sensor 470 uses any of the elements of the acoustic sensor 300. The offset acoustic sensor 470 includes a piezoelectric acoustic film 330 between conductive material on both the outer surface 332 and the inner surface 336, as described supra. A set of flexible microspheres 320 or a pressure equalizing hollow cavity are positioned between the motion sensor housing 240 and the inner layer 336 of the piezoelectric acoustic film 330. The outer surface 332 of the piezoelectric acoustic film 330 is optionally coated with a flexible solid 490 and/or a buoyancy element.

Generally, the sensor accelerometer 410, non-acoustic sensor 450, and offset acoustic sensor 470 are optionally positioned in any spatial position relative to each other. For example:
- the offset acoustic sensor 470 is optionally positioned radially outward from the non-acoustic sensor 450;
- the non-acoustic sensor 450 is optionally at a first radial distance away from the streamer cable 122 that is different than one or both of a second radial distance between the streamer cable 122 and the acoustic sensor 470 or a third radial distance between the streamer cable and the sensor accelerometer 410; and/or
- the sensor accelerometer 410, non-acoustic sensor 450, and offset acoustic sensor 470 are vertically stacked.

Stacking of at least two of the sensor accelerometer 410, the non-acoustic sensor 450, and the offset acoustic sensor 470 reduces the stiff length 480 section(s) of the sensor array 120, which aids in durability and deployment of the sensor array 120.

EXAMPLE 1

Figure 5:
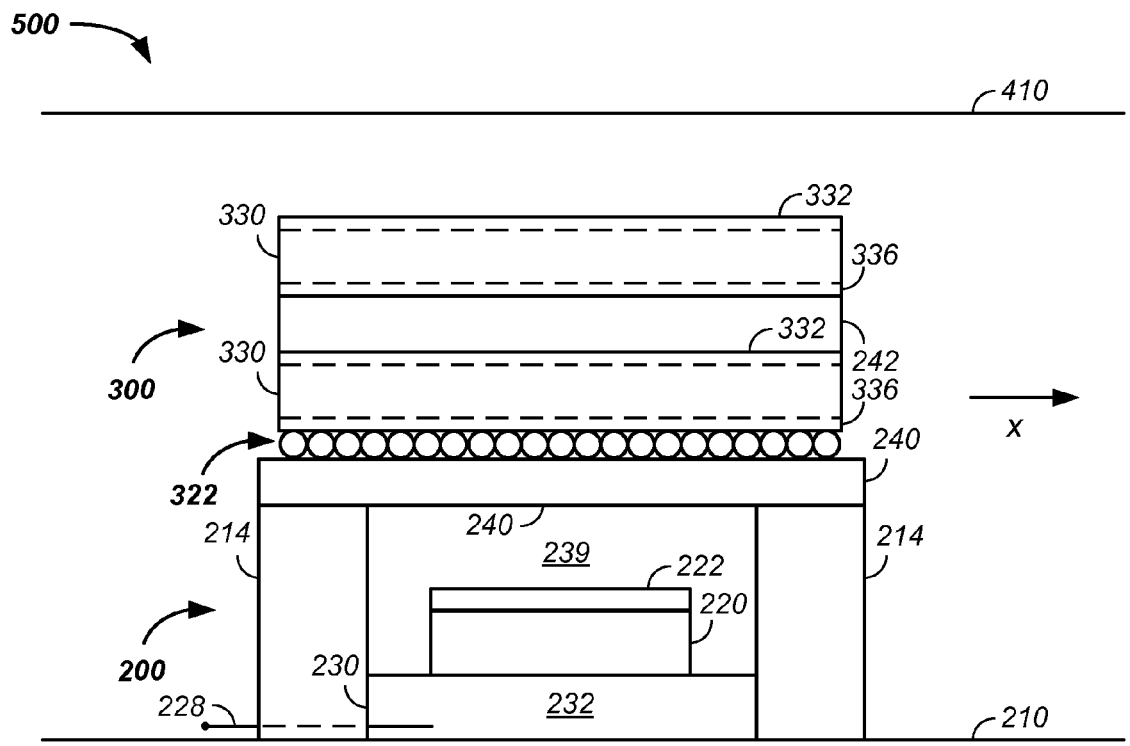
FIG. 5 illustrates a combined acoustic/motion sensor.

Referring now to FIG. 5, another example of a motion sensor and an acoustic sensor in a stacked geometry 500 is illustrated. Particular descriptions of elements provided herein optionally apply to any of the sensors described, supra, and vise-versa.

Still referring to FIG. 5, the present example describes a novel monolithic dual output, acoustic and particle motion sensor for use in a flexible syntactic elastomer based solid seismic streamer for marine seismic surveys where the acoustic sensor 300 incorporates a novel low cost method of production and provides the ability to passively detect and cancel unwanted noise due to flow using a liquid metal motion sensor 200 detecting particle motion, allowing for the combination of the resulting outputs to improve signal-to-noise ratio and recover lost bandwidth due to the interference of surface reflected energy in marine seismic surveys.

Still referring to FIG. 5, the thin film piezoelectric acoustic sensor 300 optionally uses a flexible microsphere 322 loaded adhesive transfer material, which is applied to one side of the plated film along a length from the end equal to the circumference of the outer mandrel 240. Optionally, the length of the microsphere 322 loaded adhesive material, as part of the piezoelectric acoustic sensor 300, is positioned between two adjacent strips of non-sphere loaded adhesive forming non-acoustic sensors, as described infra. The non-sphere loaded adhesive strip continues over the remaining length of the piezofilm. Beginning with the end of the piezopolymer film that is coated with the flexible microsphere loaded transfer adhesive, the film is attached directly to the rigid mandrel and wrapped around the circumference of the mandrel 240 a minimum of one single wrap or a plurality of wraps depending on the length of the piezoelectric film.

A means of connecting the electrodes of the film is provided to which wires are attached to a means by which the signal can be passed through the outer shoulders of the assembly.

Rigid stress isolating blockers specifically designed to allow for the inner molding and attachment of the embodied sensors to the primary electromechanical cable are then molded to the ends of the innermost mandrel with conductive pins insert molded to allow for the passing of the dual sensor's respective outputs through the outer shoulders to the adjacent sensors and ultimately passing the signals to the core of the electromechanical cable. The shapes at the ends of the shoulder moldings are specifically configured to prevent the entrapment of air bubbles in the vertical inner molding process.

Each individual sensor embodiment is then over molded between the previously molded shoulders resident at the ends of the individual innermost mandrels to form a smooth shape suitable for secondary over molding with an elastomeric flexible syntactic flotation material.

Streamer Cable

Completed sensor pairs are then arranged into a group of sensors that forms the acoustic and motion sensor apertures of the seismic streamer section.

The acoustic sensors 300 are typically combined electrically in parallel by use of a twisted pair of conductors connected from one sensor to the next with sufficient length so as to allow for the helix of the wire around the core cable between sensors to prevent breakage when the streamer is bent either in handling or in winding on a reel.

The motion sensors 200 are typically combined electrically in parallel by use of a second twisted pair of conductors connected from one sensor to the next with sufficient length so as to allow for the helix of the wire between sensors to prevent breakage when the streamer is bent either in handling or in winding on a reel.

The completed inner and outer molded sensor section is then over molded with a second form of glass spheres or glass microspheres loaded into an incompressible elastomeric flotation compound that creates a uniform diameter continuous flexible sensor section.

Still referring to FIG. 5, optional and exemplary relationships between sensor 124 components are further described:
- The rigid mandrel or substrate 210 forms the base of the sensor construction.
- Features molded over the rigid substrate 210, such as the inner shoulders 212 and outer shoulders 214 form the necessary cavities and supporting structures to place the components of the dual sensors.
- The polymer film motion sensor element 220 resides between the inner shoulders 212 and forms the cavity or hollow chamber 230 into which the liquid metal electrode 232 is placed.
- The motion sensor 200 shoulders 212 reside beneath or adjacent to the acoustic sensor 300 shoulders 214.
- The conductive material 228 placed around the inner base of the cavity resides in contact with the liquid metal 232.
- The second set of shoulders 214 provides for the mounting of a second rigid tube 240, which forms a cylindrical cavity 239 around the motion sensor element.
- The second rigid tube 240 forms the substrate for the acoustic sensor 300 element, which resides outside the circumference of the second rigid tube.
- The second piezo-element 330 with it's patterned syntactic loaded adhesive is then wrapped around the outer rigid substrate 240 and forms the passive flow noise cancelling acoustic sensor 300.

The electrical wires from each respective sensor are attached together either in parallel or series to create a group of sensors that comprise a discreet channel within the seismic streamer 122.

The group of sensors are placed on the core cable by sliding the cable through the inner diameter of the sensor embodiment.

Acoustic output from the acoustic sensor 300 is wired separate and apart from acceleration output from the acceleration sensor 200 and both sensors are presented to an opening in the inner electromechanical cable where they are attached to their respective pairs of wires within the core cable.

The discreet sensor embodiments are placed in a mold that presents the individual sensor embodiments to their desired locations within the group.

The group of sensors is then molded to the inner core cable with the novel shoulder shape of the individual embodiments preventing the entrapment of air bubbles during the molding process.

The cable is terminated with connectors located at each end. Each cable length comprises a section of the cable.

Each section of the cable is then presented to the process of over molding of the syntactic flotation material which completes the process of construction of the dual sensor seismic section with passive flow noise cancelling.

Still referring to FIG. 5, a description of how components work together is provided:

The first inner rigid substrate 210 provides a rigid form that isolates mechanical energy present in the core electromechanical cable from both the motion sensor 200 and the passive flow noise cancelling acoustic sensor 300.

The inner rigid substrate 210 provides a rigid form upon which mechanical features are molded. The substrate is preferably a rigid filled plastic for ease of manufacture that form the embodiment and form for both the motion 200 and flow noise cancelling acoustic sensor 300 and the later molded rigid stress isolating, bubble eliminating outer shoulders.

A piezoelectric polymer film element 220 is constructed where a single side 221 of the film 220 receives a conductive coating 222 forming an electrode plate and wrapped about the shoulders present at the edge of the molded cavity that reside about the circumference of the molded form forming a sealed cavity about the circumference and between the outer diameter of the inner molded form and the inner diameter of the wrapped piezoelectric element where the metalized electrode resides on the outer diameter of the piezoelectric film.

A conductive element 228 is wrapped a plurality of wraps about the outer diameter of the inner molded form 210 to create an inner electrode conductive surface with one end presented through and outside the sealed chamber available to attach a conductor for signal transmission.

An amount of a conductive liquid metal 232 is introduced into the volume 230 residing between the inner wrapped conductor 228 and the non-metalized inner diameter of the piezoelectric film 220 forming the second electrode of the piezopolymer transducers.

The liquid metal 232 functions as both the electrode for the piezopolymer film as well as the deforming mass of the resulting motion sensor.

The liquid metal 232 consistently resides at the lowest gravitational point in the chamber regardless of the radial orientation of the entire embodiment.

Vertical motion of the entire sensor results in the acceleration of the liquid mass 232, which deforms the area of the piezoelectric polymer film 220, changing the length of the d31 axis and d32 axis in the area in which the liquid metal 232 resides.

Those areas in which no liquid metal 232 resides do not contribute to the output of the motion sensor 200. Motion that is not in the vertical plane tends also not to create an output from the piezoelectric polymer sensor 200 with only vertical motion creating an output proportional to the change in velocity of the motion.

The motion sensor 200 is enclosed in a rigid tube 240, which prevents acoustic energy from contributing to the output of the piezoelectric motion sensor 200.

The second tube 240 forms the mandrel upon which the acoustic element is constructed and isolates the acoustic sensor 300 from mechanical energy present in the core electro mechanical cable.

A second piezoelectric polymer element 330 is constructed and plated on both sides to create a piezoelectric element. The thin film piezoacoustic sensor 300 is created using a novel flexible microsphere loaded adhesive transfer material, which covers a specific area on one side of the plated film 330 along a length from the end equal to the circumference of the outer mandrel 240 and positioned between two adjacent strips of non-sphere loaded transfer adhesive 430, 450. Regions of the adhesive strip that are not coated with spheres continue over and above the remaining length of the piezo film. Beginning at the end of the piezopolymer film that is coated with the flexible microsphere loaded transfer adhesive, the PVDF piezopolymer thin film 330 is wrapped around the circumference of the mandrel 240 a minimum of a fraction of one single wrap, a single wrap, a non-integral number of wraps, or a plurality of wraps depending on the length of the piezoelectric acoustic film 330. While a single wrap minimum is specified, it is desirable to create a complex pattern of both filled and non filled transfer adhesive to create a fractal sampling pattern for both the acoustic sensor and the turbulent boundary sensor.

Electrical connection is made to the piezoelectric film by crimps that puncture the piezoelectric film and provide a conductive path to which wires are then attached to transmit the desired signal which is a common practice in terminating piezopolymer films.

Method of Manufacture

Still referring to FIG. 5, an example of method of manufacture is described.

To make the invention, a rigid mandrel or substrate 210 is fabricated to produce a desired form factor for the final embodiment as a seismic streamer or sensor array 120. The substrate 210 or rigid mandrel is over molded to place the required features onto the surface of the rigid mandrel to allow for the mounting and isolation of the two discreet sensors, such that the two sensors occupy the same space and are deemed co-located. The two sensors are optionally the motion sensor 200 and acoustic sensor 300. The motion sensor 200 optionally uses a unique liquid metal 232 that remains liquid within the operating temperature range, is conductive, and forms the inner electrode and mass of the motion sensor 200. The motion sensor 200 is immune to acoustic energy by the placement of a rigid tube 240 that surrounds the motion sensor 200 and prevents sound from accessing the volume where the motion sensor resides. The rigid tube 240 forms the substrate or base for the acoustic sensor 300. The acoustic sensor 300 is formed around the outer substrate with a flexible microsphere loaded adhesive resident beneath and between the film element and the rigid substrate. The film can be continuous or can be comprised of discreet patterns of electrodes deposited onto the surface of the polymer film to accomplish the desired response characteristics.

Dual Element Sensors

A number of dual element sensors are electrically wired either in series or in parallel to form the desired group or aperture characteristics. Acoustic sensors are wired together providing one signal output and the acceleration sensors are wired together to provide a single signal output of acceleration. The embodiment of the group or aperture is optionally a set of elements spaced as close to one another as is mechanically practical preserving the ability to bend the aperture around a winch or sheave without damage while optimizing rejection of mechanical energy propagating along the length of the cable. The wired group is then loaded onto the core cable in the desired location by threading the core cable through the inner diameter of the combined sensor and electrically terminating to the core cable through a single opening in the core cable jacket.

The group of sensors is placed in the group mold which fixes the location of the individual sensors within the group and along the length of the entire cable; the wires interconnecting the individual elements within the group are wrapped in two directions about the core cable between the discreet locations within the group. The group is molded to the cable sealing the entrance of the wires into the core cable jacket eliminating potential leakage paths and centering the elements about the cable. Microsphere loaded solid flexible elastomer flotation is then molded over the entire cable length and over the individual groups having previously been mounted along the entire cable length.

The location of the motion sensor is optionally either beneath the acoustic sensor or adjacent to the acoustic sensor residing on the same rigid substrate. This allows for a reduced diameter of the entire embodiment as required. The spacing within the group between the discreet elements of the group is optionally varied depending on the desired response of the group with some elements spaced at one interval, some at another to tailor the response of the motion sensor to reject undesirable energy propagating within the streamer assembly essentially tuning the aperture to respond only to the desired vertically propagating signal.

The dual sensor within a seismic streamer operates with two objectives, reduction of noise due to flow and the recovery of bandwidth in the acoustic domain that is lost as a result of the energy that is propagating from the earth below, reflecting back from the sea surface and air interface, inverting and propagating down to the acoustic receivers in the streamer, thus interfering with the desired upward propagating signals causing a loss of signal within a bandwidth determined by the depth of tow relative to the reflected surface. Use of both an acoustic sensor and a motion sensor allows in post processing of the seismic data, the use of the inherent directional characteristics of motion to be convolved with the inherent characteristic lack of direction in acoustic signals to remove the downward propagating energy from the desired signals, thus recovering the lost energy and improving the resolution of the seismic data. This system provides that the motion and acoustic response from the discreet sensors result from the same excitation due to the co-location of the acoustic and motion sensors, allowing for improved processing results. The noise due to flow is reduced by placing a single continuous element where a portion of the element is bonded to the substrate using a flexible microsphere loaded adhesive, which creates the acoustic sensing portion of the element. The remaining surface of the element is coated with a non-sphere filled adhesive that bonds the polymer film directly to the surface of the rigid substrate, thus preventing its changing length due to acoustic energy and an associated change in the circumference of the microspheres residing beneath the film. The portion of the film with no microspheres responds with only one axis of deformation, that being the thickness axis, to the force created by the turbulence present at the surface of the flotation material which in the case of the area where the microspheres reside is unbounded and thus responds to the pressure. The force manifests itself out of phase with the pressure and thus the signal generated in a contiguous piece of PVDF thin film causes the two signals due to turbulent boundary layer flow noise to cancel, thus mitigating the overall response to this type of undesirable energy.

The use of these two distinct outputs from the differing sensors allows data processing for the recovery of lost energy due to the reflections from above at the air water interface. In one embodiment, the current system places both the acoustic sensor 300 and motion sensor 200 in the same physical space, thus minimizing any differences in response due to their different location. The system also provides for a uni-axial accelerometer that substantially senses only vertical motion or only vertical motion and does so with no complex mechanical parts or gimbals and resides interior to the acoustic sensor. Co-locating the sensors results in a linear transfer function between the two sensors and simplifies and improves post processing. The dual output sensor uses acceleration so that proper phase is maintained between the acoustic response and the acceleration response.

The system uses a novel acceleration sensor to enable the co-location and uni-axial sensing of particle motion in the water column with the simultaneous sensing of dynamic pressure or sound with a novel thin film polymer piezoelectric acoustic sensor with the ability to mitigate unwanted noise due to turbulent boundary layer excitation. The system uses a novel method of co-locating an acceleration sensor with this novel acoustic sensor. The invention describes a novel acoustic sensor that uses flexible micro balloons embedded within an adhesive attached to a piezopolymer element allowing for deformation in response to dynamic acoustic pressure while preserving static pressure response and eliminating destructive deformation of the polymer film sensor.

In varying embodiments, the sensor 124 comprises any of:
a thin film piezopolymer acoustic sensor incorporating a flexible microsphere loaded transfer adhesive as the compressible gas chamber providing high sensitivity and immunity to overburden pressure;
a seismic streamer for marine seismic surveys embodying a thin film piezopolymer acoustic sensor incorporating a unique flexible microsphere loaded transfer adhesive as the compressible gas chamber providing high sensitivity and immunity to overburden pressure;
a thin film piezopolymer acoustic sensor incorporating a flexible microsphere loaded transfer adhesive as the compressible gas chamber providing high sensitivity and immunity to overburden pressure combined with zones of non-microsphere loaded transfer adhesive to act as sensors of the turbulent boundary layer whose combined output provides for passive cancelling of noise due to turbulent boundary layer flow;
a seismic streamer for marine seismic surveys embodying a thin film piezo polymer acoustic sensor incorporating a unique flexible micro-sphere loaded transfer adhesive as the compressible gas chamber providing high sensitivity and immunity to overburden pressure combined with zones of non-microsphere loaded transfer adhesive to act as sensors of the turbulent boundary layer whose combined output provides for passive cancelling of noise due to turbulent boundary layer flow;

a monolithic sensor or multiple sensors housed in a single housing, such as a rigid housing, dual output, flow noise cancelling acoustic and liquid metal uniaxial motion sensor embodied in a flexible elastomer, such as a syntactic elastomer, based solid seismic streamer for marine seismic surveys;

a seismic streamer for marine seismic surveys embodying a thin film piezo polymer acoustic sensor incorporating a flexible microsphere loaded transfer adhesive as the compressible gas chamber providing high sensitivity and near immunity to overburden pressure combined with zones of non-microsphere loaded transfer adhesive to act as sensors of the turbulent boundary layer whose combined output provides for passive cancelling of noise due to turbulent boundary layer flow;

a monolithic dual output, acoustic and motion sensor co-located within a single discreet housing;

a monolithic dual output, acoustic sensor and motion sensor utilizing an acoustic sensor employing a flexible piezopolymer film, such as a syntactic backed piezopolymer film embodiment;

a monolithic dual output, acoustic and motion sensor utilizing a liquid metal electrode arrangement, which uses gravity to place the fluid mass and electrode in such a manner as to allow for sensing only vertical motion and rejecting undesirable motion;

a monolithic dual output, acoustic and acceleration sensor utilizing a novel pressure isolation method to prevent acoustic response in the motion sensor response;

a seismic streamer for marine seismic surveys embodying a thin film piezo polymer acoustic sensor incorporating a flexible microsphere loaded transfer adhesive as the compressible gas chamber providing high sensitivity and immunity to overburden pressure combined with zones of non-microsphere loaded transfer adhesive to act as sensors of the turbulent boundary layer whose combined output provides for passive cancelling of noise due to turbulent boundary layer flow combined with a novel monolithic dual output, acoustic and motion sensor utilizing a novel liquid metal electrode arrangement which uses gravity to place the fluid mass and electrode in such a manner as to allow for sensing only vertical motion and rejecting undesirable motion;

a monolithic dual output, acoustic and motion sensor embodied within a flexible syntactic seismic streamer in groups that are nested in complex spacing arrangements to enhance rejection of undesirable signals; and a monolithic dual output, acoustic and motion sensor embodied within a flexible syntactic seismic streamer allowing for the core electro-mechanical cable to reside within the diameter of the sensor embodiment.

Still yet another embodiment includes any combination and/or permutation of any of the sensor elements described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
an acoustic sensor, comprising:
a rigid tube;
an acoustic piezoelectric sensor, comprising:
a flexible film polymer, comprising: an inner film surface and an outer film surface;
a first conductive element contacting said outer film surface; and
a second conductive element contacting said inner film surface;
a plurality of flexible microspheres both proximate said second conductive element and radially inward of said second conductive element,
said acoustic piezoelectric sensor circumferentially wrapped about said hollow rigid tube, wherein said microspheres proximately contact said rigid tube.

2. The apparatus of claim 1, said plurality of microspheres configured as a compressible gas chamber responsive to pressure changes and substantially immune to overburden pressure in a marine deployed hydrophone sensing apparatus.

3. The apparatus of claim 1, said plurality of flexible microspheres comprising:
  an average cross-sectional diameter of less than about one hundred micrometers.

4. The apparatus of claim 1, wherein a majority of said flexible microspheres each comprise:
  a flexible plastic shell encompassing a sealed inner air chamber.

5. The apparatus of claim 1, said plurality of flexible microspheres configured to form a layer on said inner film surface of said acoustic film polymer, said layer comprising an average thickness of less than about five millimeters.

6. The apparatus of claim 1, said plurality of flexible microspheres configured to form a layer proximate said inner film surface of said acoustic film polymer, said layer comprising an average thickness of less than about one hundred micrometers.

7. The apparatus of claim 1, further comprising:
  a flexible transfer adhesive comprising:
    an adhesive surface; and
    a coating of said flexible microspheres on a surface opposite said adhesive surface, said transfer adhesive affixed to at least one of:
      said tube; and
      said inner film surface of said acoustic piezoelectric sensor.

8. The apparatus of claim 1, further comprising:
  a flexible solid at least radially outward of said acoustic piezoelectric sensor, said flexible solid comprising:
    a plurality of substantially incompressible glass microspheres, said glass microspheres comprising a density less than water.

9. The apparatus of claim 1, further comprising:
  means for constraining motion of at least one of a length of said film polymer and a width of said film polymer.

10. The apparatus of claim 9, said means for constraining comprising any of:
  an adhesive; and
  a wrap.

11. The apparatus of claim 1, further comprising:
  a non-acoustic piezoelectric sensor electrically coupled to said acoustic sensor.

12. The apparatus of claim 1, further comprising:
  a first non-acoustic piezoelectric sensor circumferentially wrapped about said rigid tube within less than ten centimeters of said acoustic sensor, said non-acoustic sensor directly bonded to said rigid tube.

13. The apparatus of claim 12, further comprising at least one of:
  electronics configured to remove at least a portion of a first output of said non-acoustic sensor from a second output of said acoustic sensor; and
  a communication line configured to carry first output from said non-acoustic sensor and second output from said acoustic sensor to a processing system for post-processing, said communication line running through said rigid tube.

14. The apparatus of claim 12, further comprising:
  a second non-acoustic piezoelectric sensor circumferentially wrapped about said rigid tube within less than ten centimeters of said acoustic sensor, said second non-acoustic sensor directly bonded to said rigid tube, said first non-acoustic sensor on a first side of said acoustic sensor, said second non-acoustic sensor on a second side of said acoustic sensor.

15. The apparatus of claim 1, further comprising:
  a motion sensor, wherein said rigid tube comprises an outer containment wall of said motion sensor.

16. The apparatus of claim 15, wherein said motion sensor comprises:
  a central hollow mandrel comprising a channel in an outer surface of said mandrel;
  a piezoelectric motion film covering at least a portion of the channel; and
  a conductive liquid in the channel, said conductive liquid contacting both said rigid hollow tube and said piezoelectric motion film.

17. A method, comprising the steps of:
  providing an acoustic sensor, comprising:
    a rigid tube;
    an acoustic piezoelectric sensor, comprising:
      a flexible film polymer, comprising: an inner film surface and an outer film surface;
      a first conductive element contacting said outer film surface; and
      a second conductive element contacting said inner film surface;
    a plurality of flexible microspheres affixed to said second conductive element,
    said acoustic piezoelectric sensor circumferentially wrapped about said hollow rigid tube, wherein said microspheres proximately contact said rigid tube; and
  sensing pressure changes using said acoustic sensor, wherein said plurality of microspheres comprise a compressible gas chamber responsive to the pressure changes, said microspheres substantially immune to overburden pressure in a marine deployed hydrophone sensing apparatus.

18. The method of claim 17, further comprising at least one of:
  said plurality of flexible microspheres comprising an average cross-sectional diameter of less than about one hundred micrometers;
  a majority of said flexible microspheres each comprising a plastic shell encompassing a sealed inner air chamber;
  said plurality of flexible microspheres forming a layer on said inner film surface of said acoustic film polymer, said layer comprising an average thickness of less than about one millimeter; and
  a flexible transfer adhesive comprising:
    an adhesive surface; and
    a coating of said flexible microspheres on a surface opposite said adhesive surface, said transfer adhesive affixed to at least one of:
      said rigid tube; and
      said inner film surface of said acoustic piezoelectric sensor.

19. The method of claim 17, further comprising any of the steps of:
  electrically coupling a first non-acoustic piezoelectric sensor to said acoustic sensor, said non-acoustic sensor positioned within five centimeters of said acoustic sensor; and
  combining a signal generated using a piezoelectric sensor bonded directly to said tube with output of said acoustic sensor.

20. The method of claim 17, further comprising the steps of:
- providing a motion sensor, wherein said rigid tube comprises an outer containment wall of said motion sensor; and
- using output of said motion sensor in analysis of data from said acoustic sensor.

21. A sensor, comprising:
an acoustic sensor, comprising:
- a hollow element comprising an outer surface;
- a piezoelectric acoustic film polymer, comprising: an inner film surface and an outer film surface; and
- a plurality of flexible microspheres,
- said piezoelectric acoustic film polymer circumferentially wrapped about said hollow element, said microspheres affixed to at least one of:
  - said outer convex surface of said hollow element; and
  - said inner film surface.

22. An acoustic sensor comprising:
a housing;
a rigid substrate at least partially within said housing;
a piezoelectric sensor film;
compressible and flexible microspheres between said rigid substrate and said film; and
substantially incompressible rigid microspheres within said housing, said rigid microspheres comprising a density less than water.

* * * * *